Nov. 25, 1958    R. W. SCHUMANN    2,862,190
MAGNETIC MODULATOR SYSTEM
Filed May 15, 1956    2 Sheets-Sheet 1
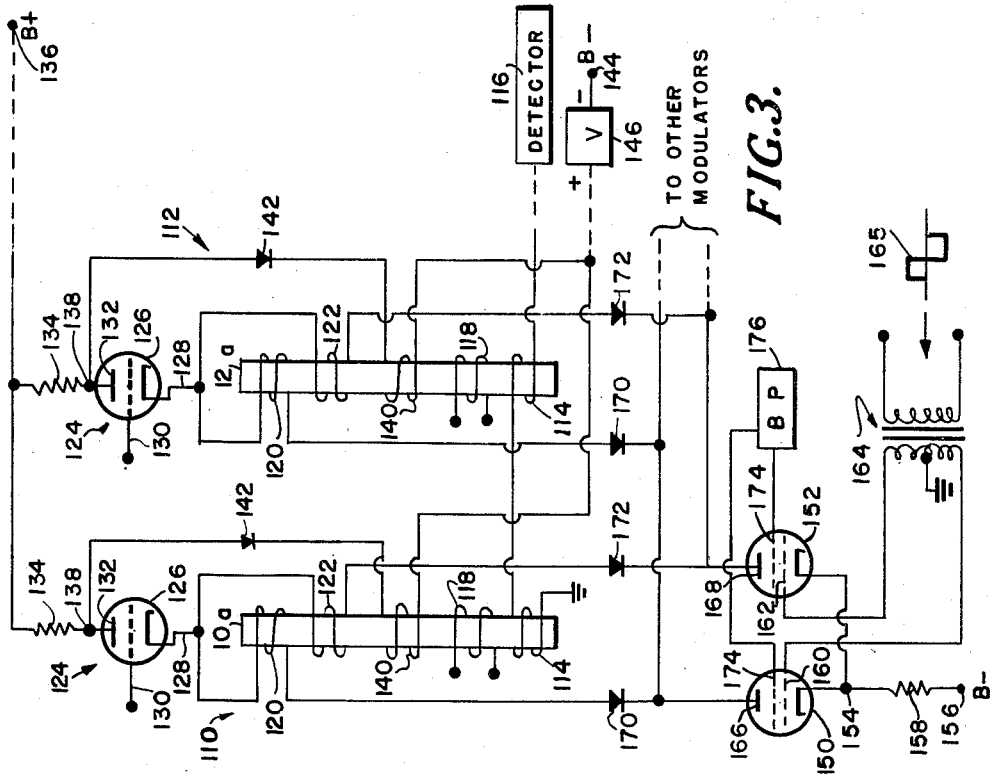
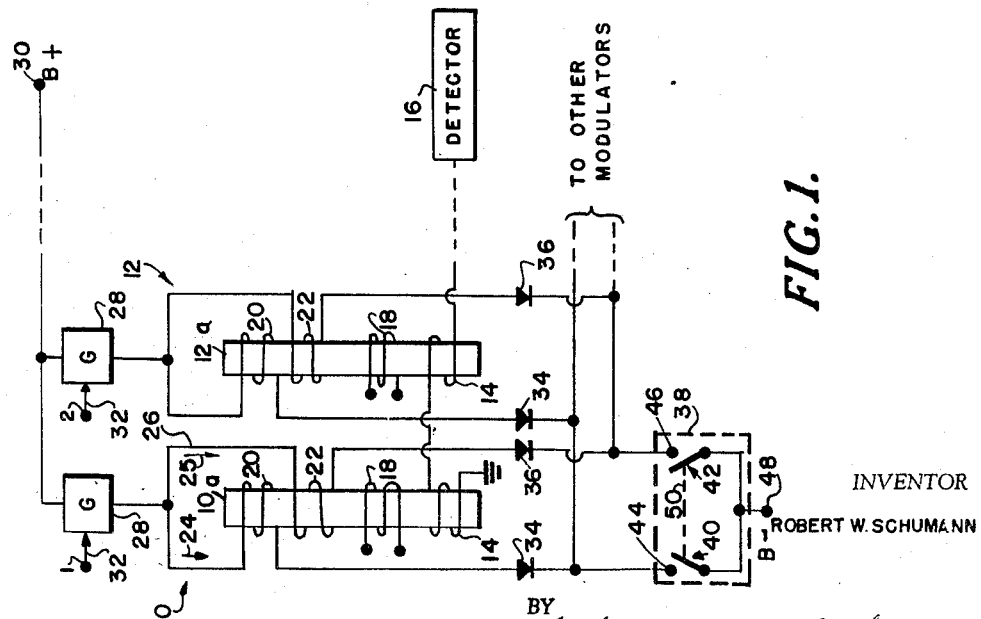
INVENTOR
ROBERT W. SCHUMANN
BY
Cushman, Darby & Cushman
ATTORNEYS Nov. 25, 1958
R. W. SCHUMANN
2,862,190
MAGNETIC MODULATOR SYSTEM
Filed May 15, 1956
2 Sheets-Sheet 2
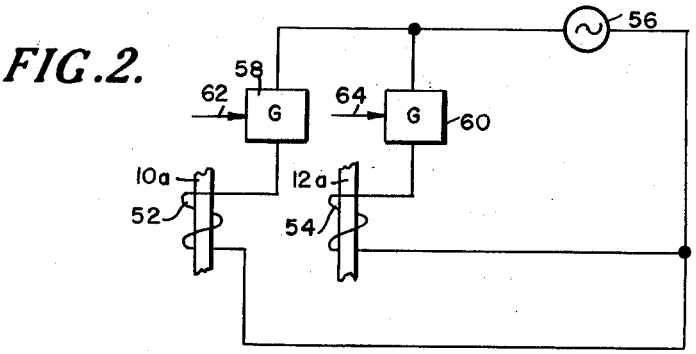
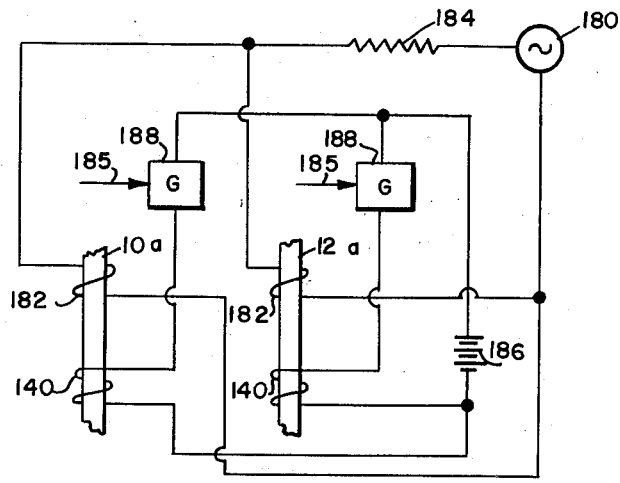
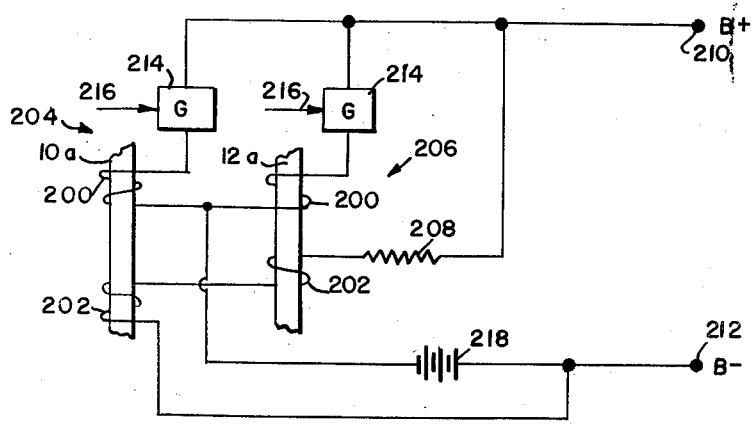
INVENTOR
ROBERT W. SCHUMANN
BY Cushman, Darby & Cushman
ATTORNEYS

United States Patent Office 2,862,190
Patented Nov. 25, 1958

2,862,190

MAGNETIC MODULATOR SYSTEM

Robert W. Schumann, Wheaton, Ill., assignor to Sperry Rand Corporation, New York, N. Y., a corporation of Delaware Application May 15, 1956, Serial No. 585,104

26 Claims. (Cl. 332—51)

This invention relates to magnetic modulator systems and, in particular, to the excitation thereof.

In any magnetic modulator system in which a number of magnetic modulators are connected with output windings in series for conveniently time-sharing a single detector, it is necessary to provide means for selectively applying excitation to the modulator desired to be used. The original source of excitation power can be time-shared by several modulators, provided the excitation when applied is such that the effective amplitude and waveform thereof is substantially the same for each modulator.

An object of the present invention is the provision of economical error-free selective excitation to one or more of several magnetic modulators.

Another object of the present invention is the provision of excitation to a magnetic modulator system in a manner such that quiescence of the unexcited modulator is obtained.

A further object of this invention is the provision of apparatus in a magnetic modulator system for saturating the unused magnetic modulators to insure complete quiescence thereof during non-use.

A still further object of the present invention is the provision of excitation means in a magnetic modulator system for gating current to alternately saturate a modulator in opposite directions when in use and in one direction only when not in use.

Another object of the present invention is the provision in a magnetic modulator system of gating means for co-operating with the switching means to provide the excitation current to the individual magnetic modulators when appropriate gating means is enabled.

Another object of the present invention in conjunction with the preceding object is the provision of a switching means which is continually operative to alternately saturate any and all of the modulators in the system when the gating means associated with the respective modulators is enabled.

A further object of the present invention is to provide excitation means including semi-conductor, non-linear devices for the modulators in a magnetic modulator system wherein the hole-storage or enhancement effect of such devices does not adversely affect operation of the system even at high excitation frequencies.

A still further object of the present invention is to provide a magnetic modulator system in which a single device, such as a thermionic tube, transistor, or magnetic core may perform the dual function of excitation gating and saturation of a non-used modulator.

Other objects and the entire scope of the invention will become further apparent from the following detailed description of exemplary embodiments of the various phases of the invention.

The exemplary embodiments, according to the invention, may best be understood with reference to the accompanying drawings, wherein:

Figure 1 illustrates a magnetic modulator system with selective excitation for respective modulators according to the invention;

Figure 2 illustrates a modification of the invention;

Figure 3 illustrates an embodiment of the system of Figure 1 in detail plus a modification whereby the modulators are completely saturated in one direction during non-use;

Figure 4 illustrates a modification of the invention, and

Figure 5 illustrates another modification of the invention.

Referring to Figure 1, there are shown two magnetic modulators 10 and 12 having magnetic cores 10a and 12a. These cores are shown as straight bars only for convenience, and it will be understood that in practice they will be of the usual type, such as a toroid. They will preferably have square loop characteristics. Throughout this description it is to be understood that as many magnetic modulators as desired may be used in accordance with this invention. For brevity, only two modulators are illustrated in a system thereof. Each modulator has and output winding 14, which windings are connected in series to a detector 16. Each of the magnetic modulators may be considered to be in a stage or channel in a system (not shown) which has a plurality of direct current outputs. Such D. C. outputs may be connected respectively to windings 18 on the magnetic modulators. Therefore, when a modulator is excited and otherwise biased, such as by an input to winding 18, the output winding associated therewith will have induced therein a current having characteristics which are proportional to the direct current on the input winding 18 during the time when the modulator is alternately saturated in opposite directions.

In the embodiment of Figure 1, saturation of each magnetic modulator is accomplished by applying current to windings 20 and 22 alternatingly. These windings are wound in opposition, and current moving in a direction according to arrow 24 through winding 20 will saturate modulator 10 in one direction, while current according to arrow 25 through winding 22 over line 26 will saturate modulator 10 in the opposite direction. The current to windings 20 and 22 is provided from gates 28 by a voltage at terminal 30 when the gates are enabled by an appropriate signal at their inputs 32.

The lower ends of windings 20 and 22 are connected through diodes 34 and 36, respectively, to switching means 38. In the switching means there are provided two switches 40 and 42 whose upper terminals 44 and 46 are connected respectively to diodes 34 and 36, and the lower terminals are connected together and to terminal 48 at which point the system is returned to the negative side of the voltage source connected to terminal 30. As indicated by dotted line 50 between switches 40 and 42, the switches are alternately opened and closed so that when one switch is open, the other is closed. The operation of the switches may be accomplished in any desirable manner, the only essentials being that they are closed at opposite times for equal periods of time and draw equal currents through each winding 20 and 22 of each modulator. As will be shown below, means 38 may be electronic rather than mechanical.

In operation the switching means 38 acts to provide alternating excitation through the selected modulator, the selection being by an enabling signal on line 32 for the appropriate modulator gate 28. Assuming the switches 40 and 42 are continuously opened and closed, each modulator whose associated gating means is enabled is alternatively saturated in opposite directions for equal lengths of time when no input is present on its winding 18. That is, when an input is present on one of lines 32, the associated gating means 28 passes the D. C. current from the voltage source connected at terminal 30, which current alternately goes through a first path, then a second path, including windings 20 and 22, respectively, to effectively saturate the modulator in opposite directions. With an input to winding 18 on one of the modulators, the core for that modulator is biased in one direction and the detector 16 detects an output from the appropriate output winding 14 corresponding to the input on the winding 18.

In the copending application of Robert W. Shumann Serial No. 585,008, filed May 15, 1956, there is an example of one form that detector 16 may take. Limitation thereto is not intended, however, since the only requirement of detector 16 is that it be capable of providing an output corresponding to an input on one of biasing windings 18.

In the illustration of Figure 1, the gates 28 may take any of a variety of forms; for example, the gates may be triodes, the plates of which are coupled in parallel to B+ at terminal 30, while the cathodes thereof respectively provide the outputs to the different modulators at their windings 20 and 22, the grids of each being connected respectively to the input lines 32. Under these circumstances, the presence or absence of a predetermined signal on any line 32 may be appropriately made to cause a space discharge current through the triode gate. Other forms of gating utilizing transistors and/or magnetic cores may be employed, however, as long as the alternating excitation current provided thereby to a selected modulator has substantially the same waveform for each half cycle. Therefore, it will be appreciated that the gating means 28 may take the form of switches of any type.

In addition to the foregoing, this invention embraces the use of symmetrical alternating current, whether sinusoidal, triangular, pulsating, or the like, from the source of excitation voltage at terminal 30, which current may be selectively switched or gated to excite any one of a group of modulators sharing the same detector. Figure 2 illustrates a modification of this type.

The magnetic cores 10a and 12a may be the same as those illustrated in Figure 1, but in Figure 2 only the cores with their respective single excitation windings 52 and 54, respectively, are shown, it being understood that the cores carry biasing input windings and output windings similar to those illustrated in Figure 1 but not excitation windings 20 and 22. A source of alternating current 56 is applied through windings 52 and 54 in parallel via gates 58 and 60, respectively, when an enabling signal is present on the enabling input lines 62 and 64. Therefore, core 10a will be alternately saturated in opposite directions when gate 58 is enabled to pass alternating current, while core 12a will be alternately saturated when gate 60 is enabled. Gates 58 and 60 may be pentodes, for example, which are designed to operate on the linear portion of their characteristic curves so that the alternating current from source 56 may pass to the excitation windings 52 and 54 without distortion on either half cycle. In this embodiment there is no need for switching means 38 of Figure 1 since the alternating current in combination with the gating means accomplishes the same result.

In Figure 3 the embodiment of Figure 1 is illustrated in greater detail along with another embodiment of this invention. Each of the magnetic modulator elements 110 and 112 (plus others, if desired) include cores 10a and 12a which have a plurality of windings including output windings 114 which are connected in series to detector 116 similar to detector 16. Signal inputs may be received on windings 118 while each modulator is alternately saturated in opposite directions by currents through a first path and a second path including windings 120 and 122, respectively. In this embodiment each modulator element is preferably maintained in a saturated state during the periods of its non-use. There will then be complete quiescence of the unexcited modulators since a signal on one of their input windings 118 cannot influence an output to the associated winding 114 unless the element is being alternately saturated.

Continuous saturation in opposite directions for each modulator is accomplished by the use of gating means 124, including triode 126 having a cathode 128, grid input 130 and a plate 132. The plate of each triode is connected through a separate resistor 134 to a source of B+ voltage connected to terminal 136. When a space discharge current is being conducted through tube 126, the voltage at its terminal 138 is low compared to the voltage at terminal 136 because of the IR drop through the associated resistor 134. However, when a tube 126 is not conducting, the voltage at its junction 138 is substantially the same as the voltage at terminal 136.

For saturation purposes, each modulator has an additional winding 140 which is connected through a unidirectional current conducting device such as diode 142 to the associated junction 138 and to B— voltage at terminal 144 through a second voltage source 146 having a threshold voltage "V" connected in opposition to the voltage source at terminals 136, 144. If the B+ voltage at terminal 136 is made slightly larger than the voltage V at source 146, current will pass diode 142 during the time when tube 126 is not conductive. However, when the tube 126 conducts and the voltage at junction 138 drops below the voltage V of source 146, no conduction of current will obtain through winding 140. Therefore, the voltages B and V may be made, for example, 300 and 290 volts, respectively, so that during non-conduction of a tube 126, the respective modulator element will be completely saturated in one direction. Tubes 126 may be responsive to the absence or presence of a signal on their grid input lines 130. Thus, it is apparent that a single triode vacuum tube may perform the dual function of gating the excitation current to a modulator during use and saturating it to quiescence during non-use. The use of both excitation gating and saturation results in significantly better overall performance of the gated modulator system than if only one of these techniques is used, although separate gating of saturation without excitation gating will be described later.

The switching means of Figure 3 is illustrated in a preferred embodiment including two electronic tubes 150 and 152, the cathodes of which are joined at junction 154 and connected to B— at terminal 156 through resistor 158. The first control grids 160 and 162 are respectively connected to either end of the secondary winding of transformer 164. When the primary of transformer 164 receives an alternating voltage having a waveform symmetrical about its axis, such as a positively and negatively going square wave 165, the tubes 150 and 152 will alternately be conductive and non-conductive since the secondary of transformer 164 is center tapped to ground. As in the embodiment of Figure 1, the upper terminals of the switches, in this case the plates 166 and 168, are connected respectively to the lower ends of each of the windings 120 and 122 and the respective diodes 170 and 172 of the different modulators, respectively. The two tubes 150 and 152 may supply current for any number of modulator elements in parallel, since in effect only one modulator element receives current therefrom at any particular time.

In operation, the switching means cooperates with the gating means to provide excitation and a signal to detector 116 whenever any of the windings 118 receive an input signal. More specifically, to detect the presence of a signal on any particular winding 118, the associated gating tube 126 receives an appropriate signal on its grid input line 130 so that the associated modulator element is no longer saturated continuously in one direction by the current through winding 140, but is saturated in opposite directions by currents alternately in windings 120 and 122. This alternation is accomplished with the aid of the switching tubes 150 and 152 as previously described. Since a D. C. signal on a winding 118 will magnetically bias the modulator and cause the switching time from one saturation state to the opposite saturation state to be different than vice versa, detector 116 will detect the D. C. signal. Resistor 158 in the cathode circuit of tubes 150 and 152 insures that conduction of these tubes does not overlap. That is, it makes the excitation switching more precise. Of course, resistor 158 is not essential to the circuit but does improve its operation.

Tubes 150 and 152 are preferably thermionic tubes which may be alternately made conductive and non-conductive in the manner herein explained. In addition, the tubes may contain a second control grid, such as grids 174. These grids, as illustrated, may be individually connected to a source 176 of blocking pulses BP. These pulses are delivered to the grids 174 alternately so that during the times when tubes 150 and 152 are to be non-conductive, a pulse from source 176 absolutely prevents conduction. This will insure that diodes 170 and 172, which in themselves provide isolation of the modulator excitation windings 120 and 122 of the different modulators, will be blocked from conduction and therefore in a quiescent state prior to excitation gating. This latter improvement of using blocking pulses is especially valuable in conjunction with gating means which do not provide for saturation of the element during non-use. However, those familiar with the art will recognize, after having a knowledge of this invention, that blocking pulses in themselves are not essential to the operativeness of this invention.

The diodes 34, 36 of Figure 1, and 170 and 172 of Figure 3 are preferably high quality diodes wherewith error-free gating is substantially attained. Even at high frequencies, the systems are not affected by the hole-storage or enhancement effects of the diodes employed. The quality of the gating action is not influenced even if junction diodes with poor recovery characteristics are employed.

If it is desired to use the saturation feature of Figure 3 without gating the excitation, it is apparent from the foregoing description that such may be accomplished by selectively gating the saturation to all the modulators in the system not in use. A modification of this type is illustrated in Figure 4 in connection with an alternating source of excitation. It will be understood, however, that excitation in this modification may be supplied in the manner illustrated in Figures 1 or 3, but without the need of excitation gates 28 or 124. Cores 10a and 12a are the same as those previously illustrated and include the saturation windings 140 of Figure 3, and input and output windings (not shown). However, since the source of excitation 180 is alternating, only one excitation winding 182 is employed on each of the cores. Resistor 184 limits the excitation current to a desirable value and allows such current to flow through windings 182 on each core in parallel and back to source 180. However, when it is desired that a modulator be not used, an enabling signal is applied to one of enabling input lines 185 and saturating current is applied from a source 186 through the enabled gate 188 through winding 140. In this manner, the modulators are completely quiescent during non-use thereof since the saturating current through windings 140 is large compared to the alternating current through windings 182 and prevents the latter from alternately saturating the cores during non-use. When use of a particular modulator is desired, a disabling signal is applied to its respective gating input line 185 so that the alternating current through its winding 182 will provide the necessary excitation to the modulator.

An additional modification of the invention is illustrated in Figure 5. This combines the saturation feature for complete quiescence during non-use while the excitation is gated to the modulators to overcome the saturation when use of a modulator is desired.

In Figure 5, cores 10a and 12a are again utilized along with windings 200 and 202 in conjunction with input and output windings (not shown) for modulators 204 and 206, respectively. Windings 202 are in series with a current limiting resistor 208 and a source of direct current voltage B applied across terminals 210 and 212, the former being indicated as "B+" and the latter as "B—." The current through windings 202 is continuous and of such amplitude as to saturate the cores 10a and 12a in a given direction continuously, in absence of current in windings 200, even though biasing inputs may be present on the input windings (not shown) such as windings 118 of Figure 3. However, when it is desired to use one of the modulators, an enabling signal is applied to the respective gate 214 at its enabling input 216 to allow current through winding 200. This current is of such amplitude as to overcome the effect of saturating current in windings 202 and drive the core into saturation in the opposite direction. To provide current of this amplitude, the source of B voltage at terminals 210 and 212 is connected in series aiding with another source of voltage 218, so that the two voltages together will supply sufficient potential to produce the desired current through the selected winding 200.

Thus it is apparent that there are provided by this invention structures in which the various phases, objects and advantages herein set forth are successfully achieved. Modifications of this invention not described herein will become apparent to those skilled in the art. Therefore, it is intended that the matter contained in the foregoing description and the accompanying drawings be interpreted as illustrative and not limitative, the scope of the invention being defined in the appended claims.

What is claimed is:

1. In a magnetic modulator system having a plurality of magnetic modulator elements coupled to a single detector, each of said elements including winding means, means including a source of excitation for saturating each element in opposite directions, means selectively coupling at least part of the saturating means to said winding means for permitting alternating saturation of the modulator element selected, and means for effectively decoupling the alternating saturation means from the unselected elements.

2. In a magnetic modulator system, a magnetic modulator element having a plurality of windings, gating means having an enabling input and an output, the latter being connected in parallel to two magnetically opposed ends respectively of two different ones of said windings, and switch means coupled to the other ends of the two different windings and to said gating means for alternately passing current through the two winds when said gating means is enabled, whereby the modulator element is alternately saturated in opposite directions an equal length of time in absence of other inputs to the modulator element.

3. In a magnetic modulator system, a magnetic modulator element having a plurality of windings, a voltage source, gating means connected to said voltage source and having an enabling input and an output for passing the current from said source when enabled, two of said windings being wound in opposition on said element and being coupled at opposing ends in parallel to said output, and switch means intercoupling the other ends of said opposed windings and the voltage source for alternately completing the circuit to said opposed windings whereby the modulator element is alternately saturated in opposite directions an equal length of time in absence of other inputs to the modulator element.

4. Apparatus as in claim 3 wherein the switch means includes two electrical switches each having one terminal connected to said other ends of the opposed windings respectively and the other terminal thereof connected to said voltage source, and means for operating said switches alternately.

5. Apparatus as in claim 4 wherein said electrical switches are each electronic tubes having at least a plate, cathode and grid with the plates being connected to the opposed windings respectively and the cathodes being connected together and to said voltage source, said means for alternately operating the switches including a transformer having a primary and a secondary, the secondary being center tapped to a reference voltage with its outer ends connected to the grids of said triodes respectively, the primary being adapted to receive an alternating symmetrical waveform.

6. Apparatus as in claim 5 wherein the electrical switches further include a second grid in each of said tubes and a source of blocking pulses connected to said second grids.

7. Apparatus as in claim 3 wherein the gating means is an electronic tube having a plate, grid, and cathode with the cathode being connected to the opposite ends of said opposed windings while the plate is coupled to said voltage source and the grid is said enabling input.

8. Apparatus as in claim 3 wherein the gating means includes a tube having a plate, cathode and a grid, the latter being said enabling input with the cathode being connected to the opposite ends of said opposed windings, an impedance connecting the plate to said voltage source, a second voltage source, one of said plurality of windings being coupled to said plate before the resistor and to the second voltage source the opposite end of which is connected in opposition to the first mentioned voltage source, the arrangement being such that the modulator element is saturated when said tube is disabled.

9. In a magnetic modulator system comprised of a plurality of magnetic modulators each having a plurality of windings including an input winding for receiving a signal to be detected and an output winding with the output windings being connected in series to a detector, excitation means for exciting each modulator alternatingly, said excitation means being in a circuit having for each modulator first and second paths each including a different winding of said plurality thereof of the associated modulator and comprising switching means alternately connecting said paths in said circuit, gating means for each of said modulators, each of said gating means being connected in said circuit and having an output connected to each of the first and second paths of the associated modulator, and means for enabling said gating means, the arrangement being such that one of said magnetic modulators is alternately saturated in opposite directions by excitation when the associated gating means is enabled.

10. Apparatus as in claim 9 wherein the first and second paths for at least one modulator includes a semiconductor.

11. Apparatus as in claim 9 wherein the switching means includes two electronic switches and interconnecting means for alternately operating the switches.

12. Apparatus as in claim 11 wherein said electronic switches are electronic tubes operated by alternate inputs at their grids.

13. Apparatus as in claim 9 wherein at least one of the gating means includes means for saturating the associated modulator in one direction only while the gating means is disabled.

14. Apparatus as in claim 9 wherein the excitation means includes a first voltage source in said circuit and at least one of the gating means includes a resistor, an electronic tube with said first and second paths for the associated modulator being connected to the cathode thereof while the plate of the tube is connected by said resistor to said first voltage source, and a second voltage source connected in opposition to the first voltage source with one of each of said plurality of windings on each modulator being connected to the associated tube plate and to said second voltage source, the arrangement being such that each modulator is saturated in one direction only until its associated gating means is enabled.

15. In a magnetic core system having a plurality of magnetic core elements coupled to a single detector, each of said elements having two opposite states of saturation, the coupling of any element to the detector being ineffective to provide a signal to said detector except when the saturation state of the element is changed, means for selectively controlling the elements to effectively couple only a predetermined number of the elements to the detector to the exclusion of the remainder of said plurality of elements, said means including winding means on each element, excitation means coupled to the winding means for causing any given element at a predetermined time to saturate cyclically between said opposite states for at least one cycle, and means for effectively decoupling said excitation means from the winding means on the elements not included in said predetermined number.

16. Apparatus as in claim 15 wherein the excitation means includes a source of alternating current, and wherein the decoupling means includes a plurality of gates connected in common to the alternating current source and respectively to said winding means for selectively exciting a corresponding element to said opposite states when enabled and for selectively decoupling said alternating current from the corresponding element when disabled.

17. Apparatus as in claim 15 wherein the excitation means includes a source of direct current and switching means for connecting said direct current to the winding means on each element in opposite senses alternatively, said decoupling means including a plurality of gates connected in common to the direct current source and respectively to the winding means for selectively allowing excitation of the corresponding element when enabled but not when disabled.

18. Apparatus as in claim 15 wherein the excitation means includes a source of direct current, means connecting said direct current source to said winding means continuously for providing a first direct current thereto to saturate all the elements to one of said states, and means including said source connectable at predetermined times to given winding means for delivering a second direct current thereto to cause saturation in the other of said states, said decoupling means including a plurality of gates connected in common to said source and respectively to said winding means for selectively precluding excitation to the corresponding element when disabled, the arrangement being such that said second direct current overcomes the saturation effect of the first direct current and saturates a given element to an opposite state when the gate therefor is enabled.

19. In a magnetic core system having a plurality of magnetic core elements coupled to a single detector, a magnetic core element having two opposite states of saturation, the coupling of said element to the detector being ineffective to provide a signal thereto except when the saturation state of the element is changed, means for providing excitation current for driving said element to opposite saturation states at predetermined times, means for precluding said excitation current from the element at times other than said predetermined times, and means for causing said element to stay in one of its saturation states continuously during said other times.

20. Apparatus as in claim 19 wherein said core element includes winding means and the means for causing saturation continuously in one state includes a source of saturation current coupled to said winding means.

21. Apparatus as in claim 20 wherein the means for saturatingly exciting said element to opposite states at said predetermined times includes the means for continuously saturating the element to one of its states at the other times, the first mentioned means further including a second source of saturation current gated at said predetermined time for saturating the element to a state opposite to the continuous saturation state.

22. Apparatus as in claim 19 wherein the means for saturating said element continuously in one state includes a source of saturation current and gating means, the latter being enabled to provide said saturation current to the element only during said other times.

23. Apparatus as in claim 22 wherein said source of saturation current is included in the exciting means and provides excitation current for the opposite state saturations at the said predetermined times, and the gating means includes a gate for passing excitation current when enabled and threshold circuit means for passing saturation current when said gate is disabled.

24. Apparatus for exciting a magnetic core element having winding means in two paths of an excitation circuit, comprising switch means alternatively connecting said two paths in the excitation circuit at predetermined times, means for providing excitation through each of said paths when respectively connected in said circuit by the switch means, and means for preventing excitation through either of said paths in times other than said predetermined times.

25. Apparatus as in claim 24 wherein the means for providing and preventing excitation to said paths includes a gate.

26. In a magnetic core system having a plurality of magnetic core elements coupled to a single detector, each of said cores having winding means and two opposite states of saturation, means including a source of excitation for saturating each element in opposite directions, means coupling at least part of the saturating means to said winding means for permitting cyclical saturation of said elements, and means for effectively decoupling the cyclical saturation means from a predetermined number of said elements when the remainder thereof is effectively coupled to the saturating means.

References Cited in the file of this patent

UNITED STATES PATENTS

| | | |
|---|---|---|
| 2,734,182 | Rajchman | Feb. 7, 1956 |
| 2,776,419 | Rajchman | Jan. 1, 1957 |